(12) United States Patent
Fascenda

(10) Patent No.: US 7,954,136 B2
(45) Date of Patent: May 31, 2011

(54) SELF-MANAGEMENT NETWORK ACCESS USING LOCALIZED ACCESS MANAGEMENT

(75) Inventor: Anthony C. Fascenda, North Bethesda, MD (US)

(73) Assignee: Koolspan, Inc., Bethesda, MD (US)

( * ) Notice: Subject to any disclaimer, the term of this patent is extended or adjusted under 35 U.S.C. 154(b) by 0 days.

(21) Appl. No.: 12/539,075

(22) Filed: Aug. 11, 2009

(65) Prior Publication Data

US 2010/0017867 A1    Jan. 21, 2010

Related U.S. Application Data

(63) Continuation of application No. 10/679,472, filed on Oct. 7, 2003, now Pat. No. 7,574,731.

(51) Int. Cl.
| | |
|---|---|
| G06F 7/04 | (2006.01) |
| G06F 17/30 | (2006.01) |
| G06F 7/58 | (2006.01) |
| G06F 15/16 | (2006.01) |
| G06K 9/00 | (2006.01) |
| G06K 19/00 | (2006.01) |
| H04L 9/32 | (2006.01) |
| H04K 1/00 | (2006.01) |
| H04L 9/00 | (2006.01) |

(52) U.S. Cl. ............. 726/2; 726/4; 726/5; 726/6; 726/7; 726/8; 726/9; 705/51; 705/52; 705/53; 705/54; 705/55

(58) Field of Classification Search .................. None
See application file for complete search history.

(56) References Cited

U.S. PATENT DOCUMENTS

| | | | | |
|---|---|---|---|---|
| 2002/0116338 | A1* | 8/2002 | Gonthier et al. | 705/52 |
| 2002/0141385 | A1* | 10/2002 | Wasik et al. | 370/352 |
| 2002/0174235 | A1* | 11/2002 | Likourezos | 709/228 |
| 2003/0204443 | A1* | 10/2003 | Knox | 705/14 |

* cited by examiner

Primary Examiner — Shin-Hon Chen
(74) Attorney, Agent, or Firm — Hunton & Williams LLP

(57) ABSTRACT

The invention provides a method and system for locally tracking network usage and enforcing usage plans at a client device. In an embodiment of the invention, a unique physical key, or token, is installed at a client device of one or more networks. The key comprises a usage application and one or more access parameters designated the conditions and/or limits of a particular network usage plan. Upon initial connection to the network, the usage application grants or denies access to the network based on an analysis of the current values of the access parameters. Therefore, network usage tracking and enforcement is made simple and automatic without requiring any back-end servers on the network while still providing ultimate flexibility in changing billing plans for any number of users at any time.

20 Claims, 7 Drawing Sheets

FIG. 4A

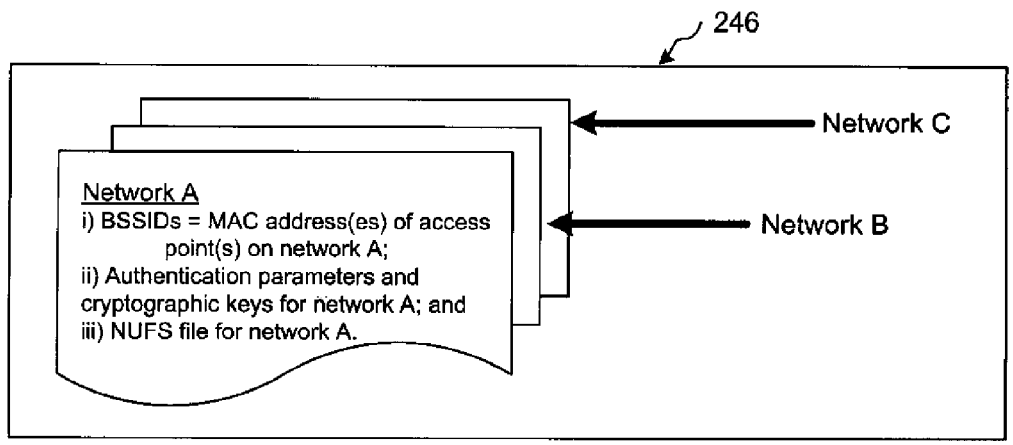

Network A
i) BSSIDs = MAC address(es) of access point(s) on network A;
ii) Authentication parameters and cryptographic keys for network A; and
iii) NUFS file for network A.

← Network C
← Network B

FIG. 4B

| NUFS ID: | AC-1075 | |
|---|---|---|
| | Initial Data | Current Data |
| No of Connections | 10 | 7 |
| Time Limit | 30 Days | ? |
| Start Time | First connection | ? |
| Price | $24.95 | |

FIG. 4C

| Access State | Network A | Network B | Network C | Description |
|---|---|---|---|---|
| Free | | X | | No restrictions on network access |
| Active NUFS | X | | | Active restrictions, see corresponding NUFS |
| Expired | | | X | Access to network restricted, only HTTP requests to billing system are permitted. |

FIG. 6A
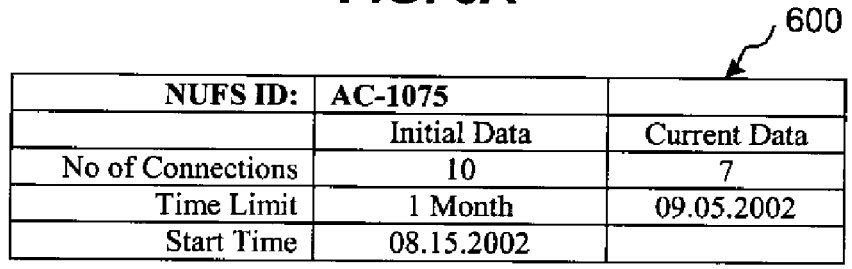
| NUFS ID: | AC-1075 | |
|---|---|---|
| | Initial Data | Current Data |
| No of Connections | 10 | 7 |
| Time Limit | 1 Month | 09.05.2002 |
| Start Time | 08.15.2002 | |
FIG. 6B
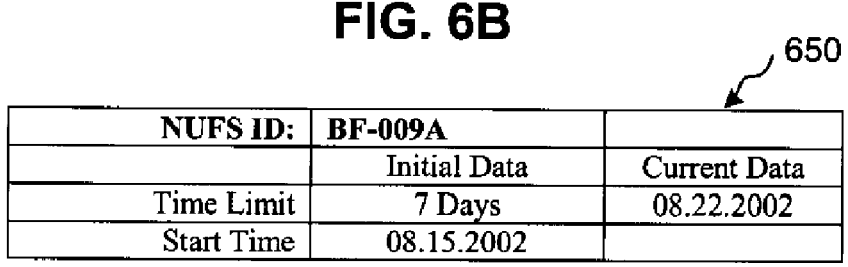
| NUFS ID: | BF-009A | |
|---|---|---|
| | Initial Data | Current Data |
| Time Limit | 7 Days | 08.22.2002 |
| Start Time | 08.15.2002 | |
FIG. 8A
| NUFS ID: | NT-701-AB-11009 |
|---|---|
| IP Range | * |
| Time of Access | * |
| Release Time | 09.05.2002, 11:50 AM |
FIG. 8B
| NUFS ID: | NT-811-CZ-407 |
|---|---|
| IP Range | 10.0.2.1:10.0.2.15 |
| Time of Access | Mon-Fri, 9am – 5 pm |
| Release Time | 09.05.2002, 11:50 AM |

SELF-MANAGEMENT NETWORK ACCESS USING LOCALIZED ACCESS MANAGEMENT

CROSS-REFERENCE TO RELATED APPLICATIONS

The present application is a continuation of U.S. Utility patent application Ser. No. 10/679,472, entitled "Self-Managed Network Access Using Localized Access Management," filed on Oct. 3, 2003. This present application hereby incorporates by reference U.S. Provisional Patent Application No. 60/447,921 filed on Jun. 13, 2003, U.S. Provisional Patent Application No. 60/414,586 filed on Oct. 8, 2003, and U.S. Provisional Application No. 60/422,474 filed Oct. 31, 2002. The present application is related to U.S. patent application Ser. No. 10/679,371, entitled "Localized Network Authentication and Security Using Tamper-Resistant Keys," and U.S. patent application Ser. No. 10/679,268, entitled "Shared Network Access Using Different Access Keys."

BACKGROUND OF THE INVENTION

1. Field of Invention

The present invention relates to wireless networking, and more particularly, to a method and system for enabling self-managed network access using localized access management.

2. Description of Related Art

A Wireless Local Area Network (WLAN) is generally implemented to provide local connectivity between a wired network and a mobile computing device. In a typical wireless network, all of the computing devices within the network broadcast their information to one another using radio frequency (RF) communications. WLANs are based on the Institute of Electrical and Electronic Engineers (IEEE) 802.11 standard, which designates a wireless-Ethernet specification using a variety of modulation techniques at frequencies generally in the 2.4 gigahertz (GHz) and 5 GHz license-free frequency bands.

The IEEE 802.11 standard, the disclosure of which is incorporated herein in its entirety by reference, enables wireless communications with throughput rates up to 54 Mbps. There are 802.11 compatible PC cards that operate in peer-to-peer mode, but 802.11 usually incorporates at least one access point, or edge device. Most access points have an integrated Ethernet controller to connect to an existing wired-Ethernet network. An 802.11 wireless transceiver connects users via the access point to the rest of the LAN. The majority of 802.11 wireless transceivers available are in Personal Computer Memory Card International Association (PCM-CIA) card form, particularly for laptop, palmtop, and other portable computers, however 802.11 transceivers can be implemented through an Industry Standard Architecture (ISA) slot or Peripheral Component Interconnect (PCI) slot in a desktop computer, a Universal Serial Bus (USB), or can be fully integrated within a handheld device.

FIG. 1 illustrates a typical conventional 802.11 network 100. Particularly, 802.11 network 100 comprises a number (N) of computing devices 110A-N and an access point 120. Each computing device 110 comprises a 802.11 transceiver (not shown) such as a 802.11 enabled network interface card (NIC) to communicate with the access point via an RF communications link 115. The access point 120 comprises a 802.11 transceiver (not shown) to communicate with a wired network via an RF communications link 125.

"Hot-spots" as 802.11 networks are known in the public space, allow users portable, high-speed access to networks. The number of hot-spots available to consumers is rapidly increasing. Each network is "802.11 compatible" and typically offers its users a variety of connection plans. For example, some connections plans allow unlimited usage, some charge users according to a fixed or variable, e.g., peak verses off-peak, rate, while others may limit a user to a predetermined number of connections. Generally, there is no limit to the number and diversity of billing schemes that so called "hot-spot" operators offer their customer base.

Typically, such usage-based plans require that the customer select a particular usage plan and pay for that plan before being able to freely use the network to the limits afforded by that usage plan. Moreover, authentication information is passed onto a remote server, which accounts for and tracks the user's usage of the network at each time a connection is made to a hot-spot. This is generally burdensome and involves considerable non-revenue producing administrative traffic and hence possibly causes delays to users of the network As all users are usually tracked from a central site, the infrastructure required to support large numbers of users can be daunting. Furthermore, setting up and modifying particular usage plan parameters for a large number of individuals is often not an easy or efficient task.

Network operators generally prefer to respond to a market as conditions dictate. For example, a usage-based plan that had previously been sold for "10 connections per month at $24.95" might be offered the next day for "15 connections per month at $19.95." Implementing plan changes in a centralized network billing system is a complex process. For instance, the billing system must not only account for the current usage/billing plans implemented, but must also account for all previous plans that users still have in effect.

Equally important are the needs of enterprise information technology (IT) administrators who prefer to provide different access schemes to specific classes of users on the enterprise network. For example, it might be highly desirable to allow a finance clerk who works a day shift, e.g., 9 AM to 5 PM, Mondays through Friday, to have access to a finance network only during the normal working hours. Attempts to use the network at any other time would be restricted. Microsoft® Windows provides for authentication classes, but is generally limited to a YES/NO basis. For instance, users are entered into a database or directory of users that Windows implements when it authenticates a user, typically a RADIUS (Remote Access Dial-In User Service) server. Typically users are given account names and passwords to identify themselves and placed into workgroups. Individual users can be granted access in a PASS/DENY basis for individual machines or groups of machines. Likewise, groups can be granted permission to individual machines on the network. The permissions are always PASS/DENY, ALLOW/RESTRICT, etc. However, in Windows it is difficult to tie other parameters to a user's permission such as PASS or ALLOW to a FINANCE SERVER during normal working hours, but DENY or RESTRICT on nights and weekends. The tie-in of PASS/DENY along with TIME-OF-DAY is difficult to accomplish. In other words, providing access to individual users and groups of machines based on, for example, the period of the workweek is a daunting, if not impossible, task via Windows.

Of further difficulty for the host of a public 802.11 network is properly facilitating access to foreign customers, i.e., those customers who are foreign to the local network. At the Dallas Fort Worth airport, for instance, a Wayport® network is installed to provide travelers with wireless Internet access.

Until recently, only Wayport customers could access this network e.g., a T-Mobile customer could not connect unless the user registered to become also a Wayport customer. Boingo offers a service whereby users can access a Wayport network without necessarily being a customer of Wayport.

Boingo employs a 'sniffer' program that listens to the beacon frames and looks for a match in its database of known network configurations. When a match is found, the Boingo software will automatically make the appropriate configuration changes for that network and allow the user to connect. Once a connection is attempted, the user appears to the network as a Boingo customer and the user's credentials are passed onto an authentication server for the network. On recognition of the user's name at the authentication server, access is then granted or denied. If the Boingo customer is not really a customer of the present network, the authentication server forwards the user's credentials to a Boingo authentication server, which performs the necessary authentication service and if valid, passes a 'grant' command back to the original network authentication server. One disadvantage with this approach is that the Wayport user may be on a different billing plan than the Boingo customer who is using the same network for the same usage plan. This becomes difficult to manage as the number of users and networks grow.

SUMMARY OF THE INVENTION

The present invention overcomes these and other deficiencies of the related art by providing a method and system to make network usage tracking and enforcement simple and automatic without requiring any back-end servers and alleviating the need to handle large numbers of network parameters and to track usage while still providing ultimate flexibility in changing billing plans for any number of users at any time.

In an embodiment of the invention, a method for managing network access of a device, which is a capable of communicating with one or more networks, comprises the steps of: storing one or more network access parameters in a secure token local to the device and determining if any of the network access parameters have been met or exceeded. In an embodiment of this invention, any access point is enabled to analyze the parameters stored in the secure user token and grants access based on that stored information. The access point, or edge device, can make a logical decision based on the parameters stored in the token without having to further check with a network-based or remote server. A network access parameter can be a maximum number of connections to the network, time of day, period of time, day in week, date, range of dates, maximum period of time spent connected to said network, device address, subnet ID, or LAN ID. If any of the network access parameters have been met or exceeded, access to the network is denied. If none of the network access parameters have been met or exceeded, access to the network is granted. In a related embodiment of the invention, upon determination that an access parameter has been met or exceeded, a user is presented with the option of purchasing additional usage by a limited connection to a remote server on the network. In another related embodiment, the network access parameters of multiple networks are stored within the secure token.

In another embodiment of the invention, a physical token comprises: a communications interface for communicating data to and from the physical token and a storage including at least one access parameter associated with a first network. Then at least one access parameter is part of a first usage plan for the first network. A usage application is provided in the storage for tracking and enforcing usage of the first network according to the first usage plan. An adapter is provided for connecting the physical token to a device capable of communicating with the first network. The storage may further include at least one access parameter associated with a second network and/or authentication information for authenticating the device with the first or second networks.

One advantage of the invention is that it provides at each computing client device a tamper-resistant physical token that holds credentials such as authentication, billing, and usage parameters for multiple networks, thereby providing usage enforcement at the client and roaming capabilities without having to contact a central server or manually change network configurations at the client device. The credentials Are stored in the secure, tamper-resistant physical token in such as way as to prevent modification by the user. An essential element is that the user has no access or capability to otherwise modify the network parameters stored in the client device by the network and thus the network edge device can trust the information it receives from the client device.

Another advantage of the invention is that it provides enormous benefits to the network administrator as it allows the operator to define the limits by which any particular user can access the network, then download those parameters securely into a physical token, and not have to monitor the users access thereafter with complete assurance that the user will not be able to exceed those limits.

Another advantage of the invention is that it enables the efficient implementation of complex network access rules for various users without requiring a burdensome infrastructure or complex software to be installed, maintained, and managed on the network.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIG. 4 illustrates an exemplary format of sets of network parameters for stored in a client key pertaining to multiple accessible networks according to an embodiment of the invention;

FIG. 6 illustrates two exemplary NUFS according to an embodiment of the invention;

FIG. 8 illustrates two exemplary class of services defined in two respective NUFSs according to an embodiment of the invention.

DETAILED DESCRIPTION OF THE PREFERRED EMBODIMENTS

Figure 1:
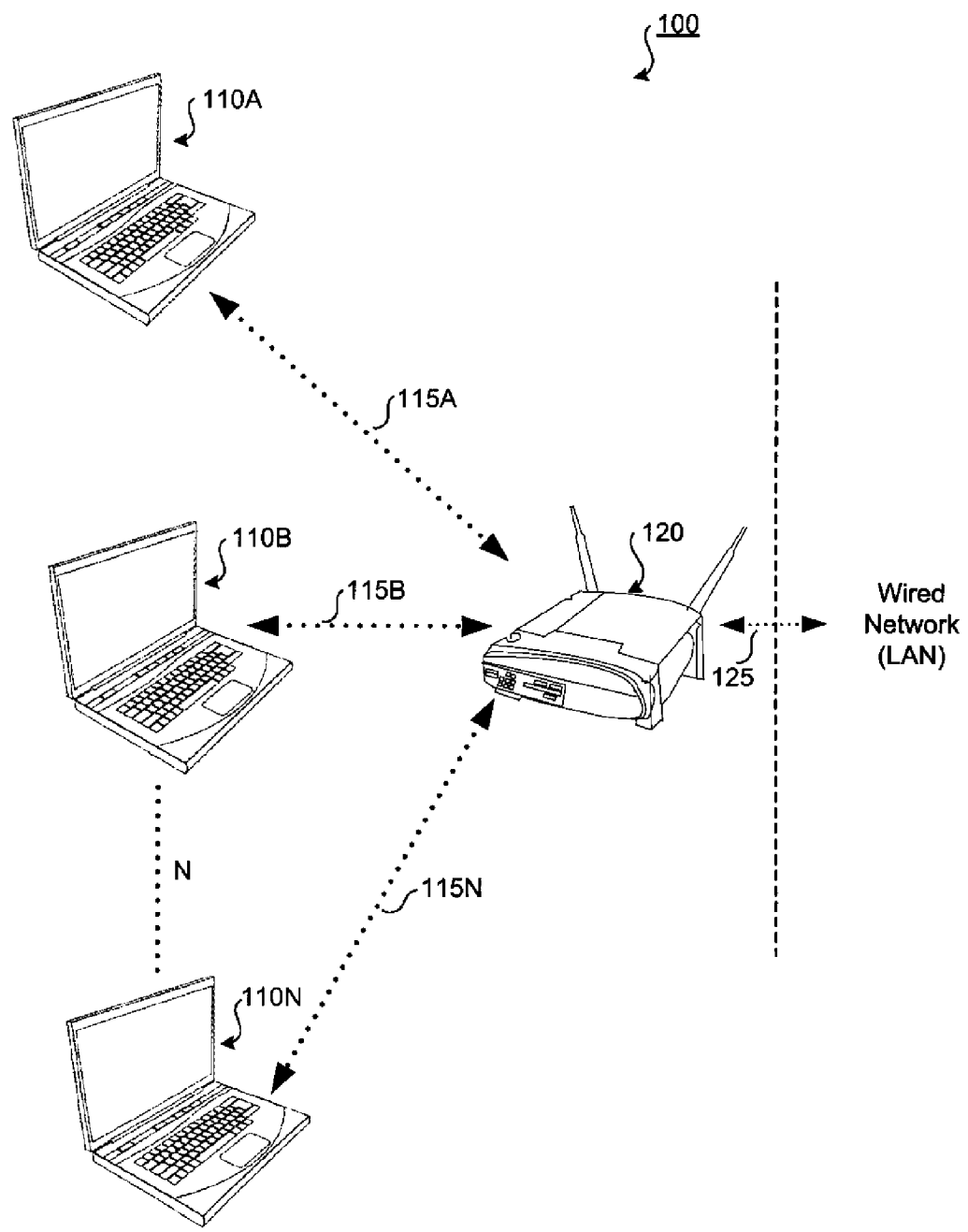
FIG. 1 illustrates a conventional 802.11 network.

Preferred embodiments of the present invention and their advantages may be understood by referring to FIGS. 2-8, wherein like reference numerals refer to like elements, and are described in the context of a 802.11 network. Nevertheless, the present invention is applicable to other computing networks including various wired and/or wireless based communication networks in general.

The present invention provides, inter alia, a secure, local edge method and system of tracking and enforcing a user's network usage and allowing the user's device to automatically provide feedback to the user as to the user's usage without requiring network access or a connection to a remote server. As the following describes in enabling detail, the invention is generally realized via a combination of software routines and physical keys in the form of easy-to-use adapters that are installed into client computing devices via, for instance, an available USB port. These physical keys are secure, tamper-resistant tokens capable of tracking and enforcing network usage in view of pre-defined conditions and/or limits. In a preferred embodiment of the invention, the physical keys also facilitate the authentication of the client computing devices on the network and provide secure data communication across the network using, for example, authentication parameters such as one or more cryptographic keys, which are pre-stored in secure storage within the physical keys. For example, an authentication and secure data communications system and method is implemented as described in commonly assigned and corresponding U.S. patent applications Ser. No. 10/679,371, entitled "Localized Network Authentication and Security Using Tamper-Resistant and Keys," and 10/679,268 entitled "Shared Network Access Using Different Access Keys," filed concurrently herewith, the disclosures of which are incorporated in their entirety herein by reference. In an alternative embodiment, other types of cryptographic authentication and/or data security techniques may be implemented such as, but not limited to a Public Key Infrastructure (PKI). In yet another embodiment, Wired Equivalent Privacy (WEP) is implemented in place of any authentication or data security system and method facilitated by the physical keys.

Figure 2:
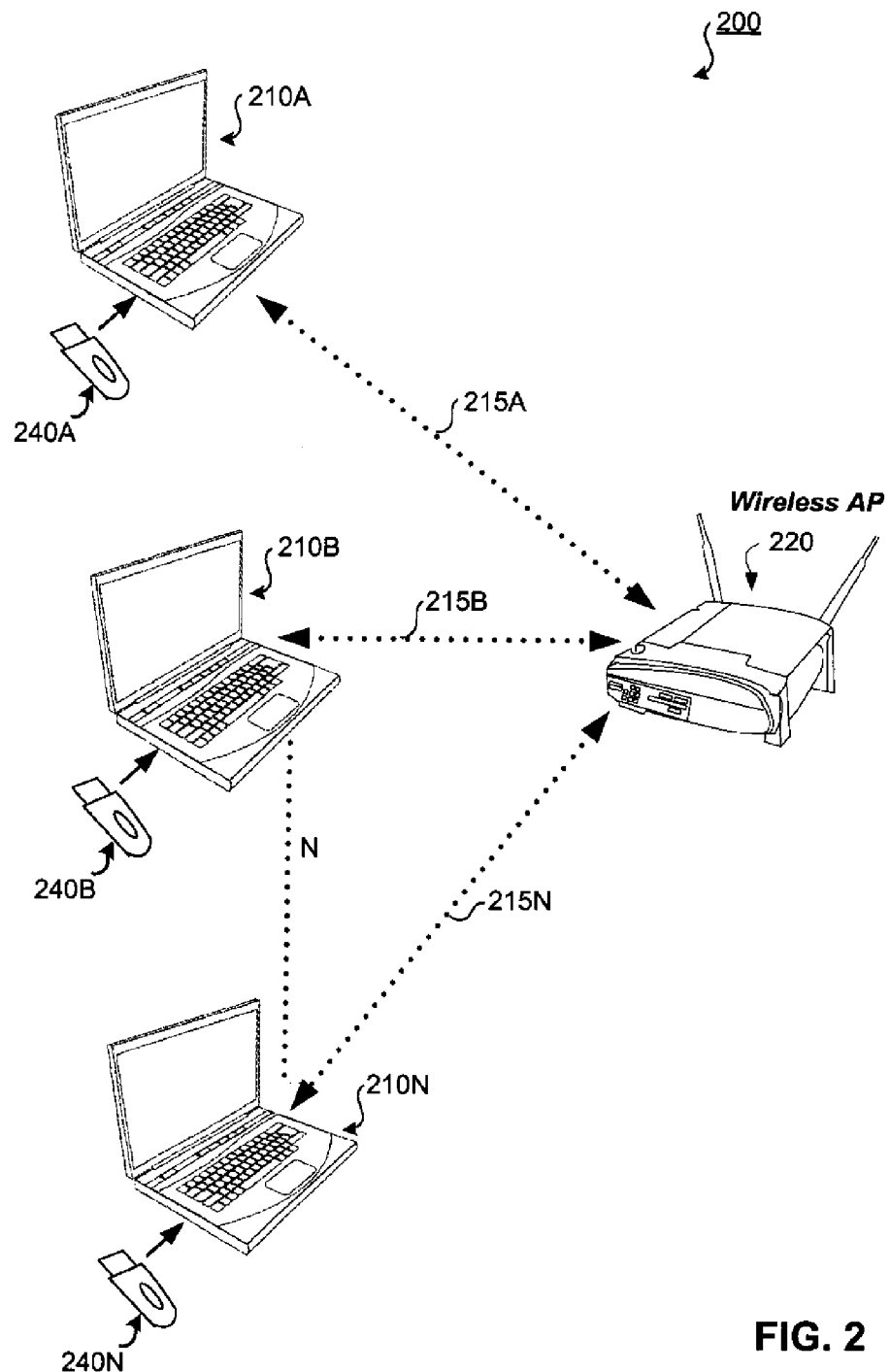
FIG. 2 illustrates a 802.11 communications network system according to an embodiment of the invention.

FIG. 2 illustrates a secure 802.11 network system 200 according to an embodiment of the invention. Particularly, the 802.11 network 200 comprises a number (N) of computing devices 210A-N and a wireless access point 220. Each computing device 210 comprises a NIC (not shown) to communicate with the access point 220 via a non-interfering 802.11 channel 215. The access point 220 comprises a 802.11 transceiver (not shown) to communicate with a wired network (not shown), thereby providing the computing devices 210 with access to each other and the wired network. Although each computing device 210 is illustrated as a laptop, other 802.11 enabled computing devices such as, but not limited to Personal Digital Assistants (PDAs), desktops, workstations and the like can be employed on the network 200. One of ordinary skill in the art recognizes that more than one wireless access point 220 may be implemented on the network 200 to provide multiple hot-spots.

Each computing device 210 is provided with a unique client key 240 that is installed into an available USB port (not shown) of the computing device 210. It is important to note that installation of the client keys 240A-N into USB ports is exemplary only. One of ordinary skill in the art recognizes that the client keys 240A-N can be alternatively implemented through any available connection configuration such as, but not limited to an expansion card installed via a PCI or ISA slot; a physical token connected via a serial, parallel, or other type of communications port; an Ethernet card; or a wireless smart card.

Figure 3:
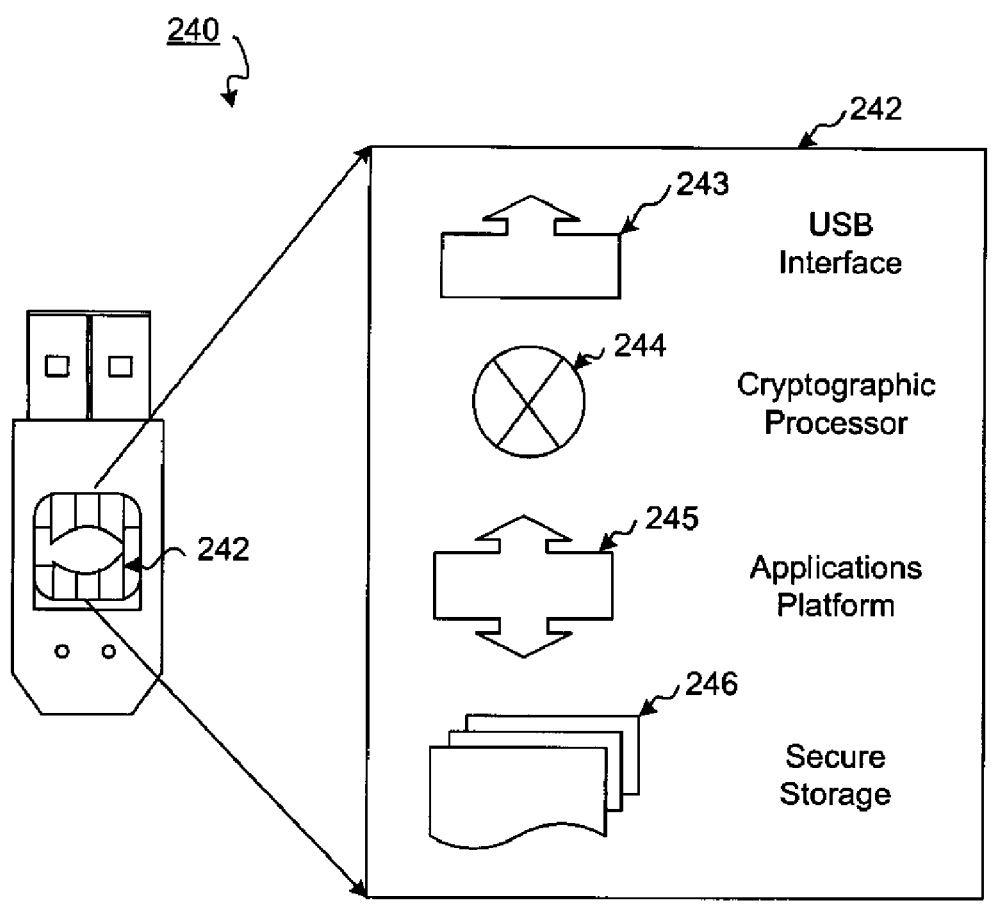
FIG. 3 illustrates a functional block diagram of a client key according to an embodiment of the invention.

Referring to FIG. 3, a functional block diagram of a client key 240 is illustrated according to an embodiment of the invention. The heart of each client key 240 is an embedded tamper-resistant token 242 such as a Subscriber Identity Module (SIM) or the like that is unique to each key 240. Each token 242 is unique in that it stores a unique serial number installed at the time of manufacture to provide positive identification of each physical key 240. The token 242 features an integrated circuit or processing means. the identification of which is apparent to one of ordinary skill in the art, comprising a USB interface 243, a cryptographic processor 244 if necessary for security purposes, an applications platform 245, and a nonvolatile secure storage 246. The cryptographic processor 244 can generate, for example, Data Encryption Standard (DES) or 3DES cryptographic keys or implement PKI functionality by generating Rivest, Shamir and Adleman (RSA) public/private key pairs. In another embodiment of the invention, all cryptographic processes are implemented by a central processor, such as an Intel® Pentium® 4 outside the key 240 without the need for or presence of the cryptographic processor 244. In yet another embodiment of the invention, a dedicated cryptographic co-processor is employed on an expansion card. This might be done to remove the encryption overhead from the central processor.

As will be described in further detail, the applications platform 245 executes a usage tracking and enforcing software routine (herein referred to as the "usage application"), which controls access to and tracks usage of the network 200. The usage application can be pre-installed into the client key 240 during initialization of the key or downloaded to the applications platform 245 at subsequent times thereafter.

In order to provide the instructions necessary to implement data communications with the client key 240, the drivers associated with a standard wireless NIC are supplemented with an Intermediate Network Driver Interface Specification (NDIS) driver. The NDIS Intermediate driver encrypts/decrypts communications to and from an access point while ensuring delivery of standard 802.11 functionality as well as compatibility with 802.11 certified products. The NDIS Driver enables the transferring of data to/from the SIM 242. The usage application executing on platform 245 interacts with the driver to send and receive communications in for example, a Transmission Control Protocol/Internet Protocol (TCP/IP) format, between the NIC and the access point 220. In an embodiment of the invention, once a computing device receives an IP address upon successful authentication, the usage application is automatically activated. Likewise, the usage application is automatically deactivated once the user disconnects from the network 200.

A particular useful feature of the present invention is that a client key 240 may be initialized for multiple 802.11 networks for which the holder of the key has been granted access. In other words, one client key 240 allows the user to access multiple 802.11 networks. For example, the secure storage 246 of the client key stores a set of parameters for each network or optionally for individual access points. An exemplary illustration of this concept is depicted in FIG. 4A, wherein the secure storage 246 of a client key 240 holds a set of appropriate network parameters for three individual networks A, B, and C accessible to the computing device 210. In an embodiment of the invention, a set of network parameters comprises one or more access point identifiers or basic service set identifiers (BSSID) corresponding to the access points associated with the network 200, pertinent authentication and security data such as cryptographic keys in order to authenticate the computing device and/or provide secure communications as appropriate, and particular access and tracking data. The access and tracking data comprises access information established by a network operator or administrator, and tracking information detailing network connection history. The access information generally comprises data associated with the limitations and conditions of the particular network usage plan established. For example, it might be desirable for network access to be conditioned on variables such as, but not limited to the time of day, day(s) of the week, days in a month, night versus day or peak time versus non-peak time, workday versus weekend, hours of use, number of connections, machine-specific access (such as access to a Billing Server, Accounting Server, etc.), subnet identification, local access network (LAN) identification, internet protocol address(es). The variables are exemplary only and merely touch on the numerous possible conditions that might be pertinent to network administration.

The access and tracking data is stored, for instance, in a single data file herein referred to as a "Network Usage Feature Set (NUFS)." FIG. 4B illustrates an exemplary format of a NUFS established for a particular network where access is established for a billing plan that allows for ten (10) connections per month at a cost of $24.95. Particularly, this illustrated NUFS comprises three (3) columns, two of which specify the initial and current access information. The initial access information details, inter alia, the limits and conditions of the usage plan as set by an administrator or the like. For example, only ten (10) connections are permitted per month in the present NUFS. The current access information tracks particular variables such as the number of connections counted in the current billing period, e.g., seven (7), which are interpreted by the usage application as described below. In the example illustrated, each individual row details a particular item or condition such as the number of permitted connections, e.g., "10"; the applicable time period, e.g., "30 days"; the start of the time period, e.g., "first connection," i.e., the time that the first connection has been established; and optionally the price, e.g., "$24.95". A NUFS identifier is given, e.g., "AC-1075", to identify each particular NUFS. Each NUFS is installed into the secure storage 246 at the time the client key 240 is initialized for a particular network or installed and/or updated at a later time through a secure communication from a remote server. For example, consider the scenario where a network provider displays the available usage plans to a user via a website. Once a user selects a desirable plan and payment is tendered, the appropriate NUFS is downloaded to the secure storage 246 of the user's client key 240.

In an embodiment of the invention, each accessible network A, B, and C has a NUFS associated with it. In another embodiment of the invention, only a portion of the accessible networks have an associated NUFS. To assist the usage application in distinguishing those accessible networks that have an associated NUFS from those that don't and to identify the access state of each network, an additional access state file is provided, an example of which is illustrated in FIG. 4C. As illustrated, this file distinguishes between three possible access states possible for a network: restriction-free access; active restrictions according to a corresponding NUFS; and limited access, e.g., only hyper-text transport protocol (HTTP) requests to a billing system are permitted. These access states are exemplary only and other access states that a network administrator deems necessary may be implemented. Moreover, only one access state can be implemented for individual network at any particular time. As the example indicates, the access state of network A is in the active restrictions state and accordingly a corresponding NUFS exists; the access of network B is free access, for instance, network B may be a company intranet for which the user is the company CEO and unlimited access to the network is necessitate; and the access state of network C is expired. In an embodiment of the invention, the default access state is unrestricted access, i.e., the user's client key 240 will not interfere with network access once the user is properly authenticated. At a later time, however, a network administrator can download a NUFS to the client key 240 that is recognized by the usage application in order to restrict use of the corresponding network in accordance with the downloaded NUFS parameters/conditions.

It is important to note that the illustrated data storage format of the NUFS and access state file is exemplary only and that other formats may be employed, the identification and implementation of which are apparent to one of ordinary skill in the art. The important concept here is that network access is based on any number of conditions, which are securely stored in the client key 240 itself.

In a related embodiment of the invention, the access point 220 maintains accurate time by receiving periodic updates from a reliable time source and communicates such to the usage application. For instance, a reliable time source can take the form of secure network clock set up by an administrator or an external time source that broadcasts accurate time via the Internet or a radiofrequency (RF) channel. Having the access point 220 track time as opposed to keeping time internally in the computing device 210 itself is preferable as it prevents or at least discourages an interloper from tampering with the time source to gain access during a time period otherwise not accessible. Moreover, it allows the usage application to learn the precise date and time within reasonable tolerances in order to maintain accurate usage tracking. In an embodiment of the invention, the time transmitted from the access point 220 to the computing device 210 is encrypted using one or more cryptographic keys stored in the client key 240.

Figure 5:
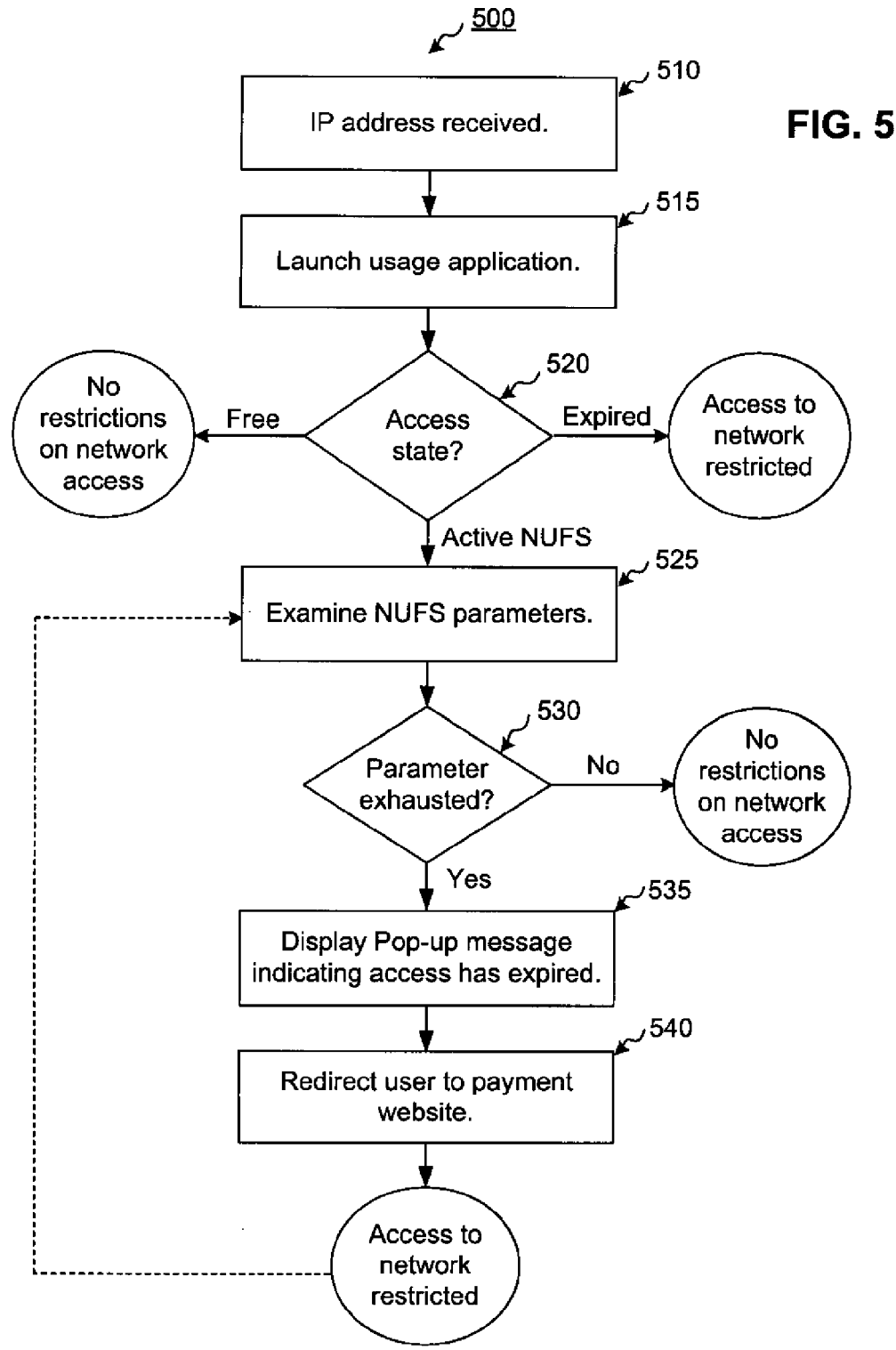
FIG. 5 illustrates a method for providing self-managed access according to an embodiment of the invention.

FIG. 5 illustrates a method 500 according to an embodiment of the invention for providing the self-managed access described above. In operation, once a user successfully connects to the local network 200 and an IP address is received (step 510) at the computing device 210, the usage application automatically launches (step 515) and identifies (step 520) the access state of the corresponding network from the access state file stored within secure storage 246. If the access state is in either the free access or expired access states, then the corresponding access is implemented as detailed above. If the access state specifies active restrictions under a corresponding NUFS, then the usage application examines (step 525) each of the parameters in the NUFS to determine (step 530) if any parameter has been exhausted, i.e., its limit has been exceeded or met.

Examination of a NUFS is illustrated with particularity by the example presented in FIG. 6A, which depicts an exemplary NUFS 600. The NUFS 600 specifies current access parameters corresponding to a particular network. For instance, assume that prior to the present connection, six previous connections have been made and an expiration time has been set for one month after a start time of "08.15.02". Upon the present connection, the total number of connections is incremented from six (6) to seven (7), a number that is below the authorized limit and therefore not a problem. The next parameter, time limit, was established as one (1) month beyond the first connection. In order to ascertain the correct time per the embodiment described above, the client key 240 instructs the NIC driver to request the date and time from the access point 220. In a preferred embodiment, the request is encrypted with an appropriate cryptographic key stored within the secure storage 246 prior to transmission to the access point 220, which upon receipt decrypts this request with the corresponding decrypting key and returns a TCP/IP packet containing the date and time encrypted with the appropriate encryption key. This packet is decrypted by the NIC driver and then passed to the usage application. The usage application now compares the current date, e.g., assume a current date of "Sep. 5, 2002", against the time limit of "Sep. 15, 2002". As this latter date has not passed, this access limit has not been met. As there are no further parameters to check in the NUFS 600, the user is allowed unrestricted access to the network 200 for the present connection. In an embodiment of the invention, the NUFS is rechecked periodically to prevent long connections from exceeding any of the access time constraints.

Consider another NUFS having an access parameter that has been exceeded. Referring now to FIG. 6B, NUFS 650 allows the user unrestricted access for a time period of seven (7) days beginning with the first connection, which has been established, for example, on "Aug. 15, 2002". Assuming that the current time returned from the access point during the present connection is that of the above example, e.g. "Sep. 5, 2002", the usage application determines that this is beyond the seven-day limit established by the NUFS 650.

On determination that a NUFS access limit has been met, the usage application optionally displays (step 535) a pop-up message notifying the user that the usage account on that network has expired. The usage application then instructs (step 540) the NIC driver to send an encrypted TCP/IP packet to the access point 220 informing it that all further TCP/IP traffic from the user must be restricted to web based HTTP requests, e.g., via port 80, and that no user packets are allowed past the access point except for HTTP requests and those will be redirected to the network billing website. Optionally, the user may be directed (step 545) the user to an internal reauthorization website for purchasing additional usage on the network. If the user purchases additional usage, a new NUFS is downloaded to the client key 240 and steps 525 and 530 are repeated on the new NUFS. In another embodiment of the invention, an optional parameter may be attached in the NUFS that instructs the usage application to 'kill' the client key, e.g., the authentication parameters stored within are deleted, thereby prevent a user to reconnect to the network, when the NUFS is exhausted.

It is important to note that any criteria for managing user network access can be implemented in this manner. Since network access is almost always determined a priori, these conditions can be stored in the user's client key 240, thereby enabling access control thereafter not by an online back-end authentication server, but automatically by the user's own software embedded into the client key 240. This is possible because the user cannot modify the network access parameters and restrictions that have been pre-stored in the client key 240. In essence, the present invention achieves a 'fire-and-forget' method of managing access. In other words, once given access, there is no need to further monitor or account for the user's access at a centralized server or the like because (i) the client key 240 limits the user's network access as provided without further intervention and preferably (ii) the monies for the network access have already been collected in advance.

Consider the situation where the client key 240 is lost or stolen, or the network operator wishes to discontinue a user's network access for whatever reason.

In an embodiment of the invention, each client key 240 requires a personal identification number (PIN) to unlock it before each connection attempt or each time the key is inserted into the computing device 220. Therefore, if the client key 240 is lost or stolen, it is of little use to the person who has recovered the client key 240 (assuming the new owner does not have knowledge of the PIN used to unlock the key). As a safety measure, if the user enters the PIN incorrectly three or some other specified number of times, for instance, the client key 240 is rendered permanently useless.

Figure 7:
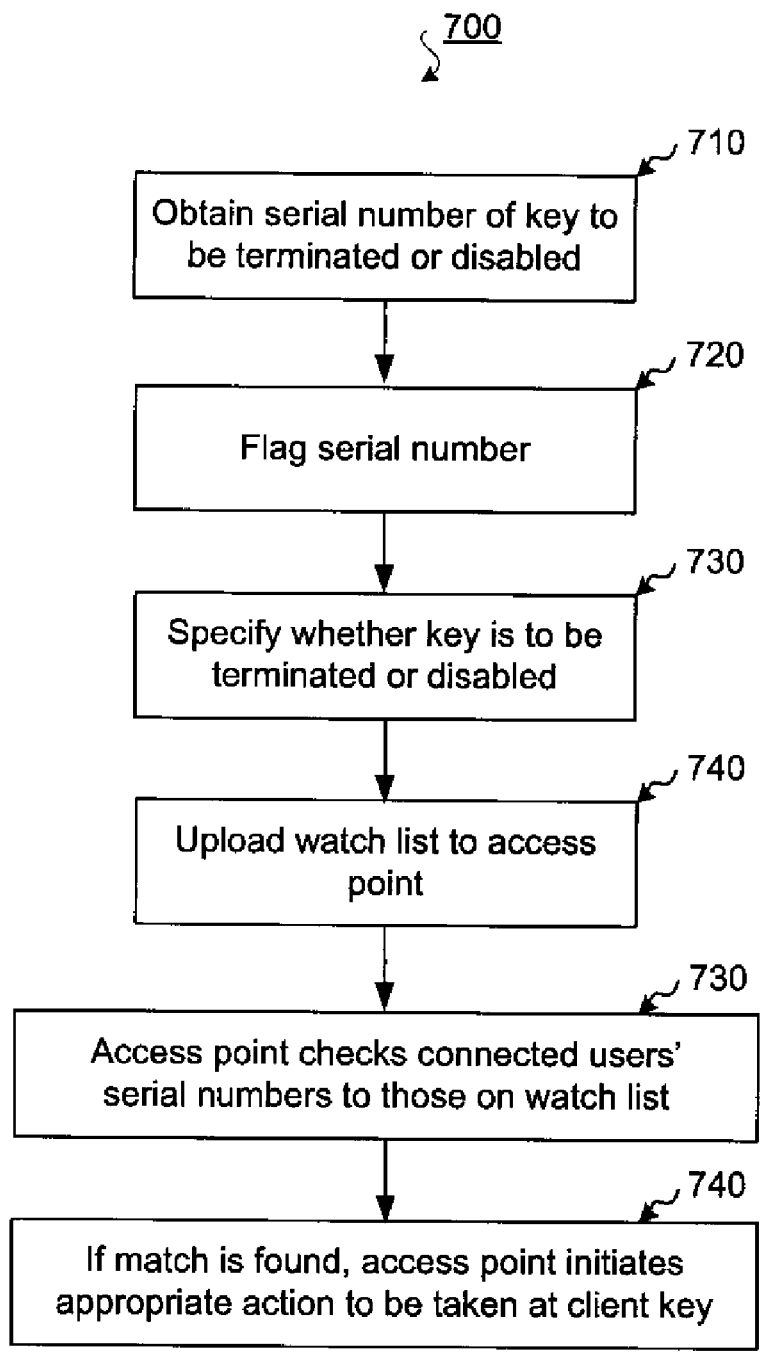
FIG. 7 illustrates a method for disabling or killing a client key according to an embodiment of the invention.

Referring to FIG. 7, a method 700 is illustrated for disabling or killing a client key 240 according to an embodiment of the invention. Particularly, upon determination that network access is to be discontinued for a particular user on a network, the network administrator obtains (step 710) the serial number of the user's client key 240. This serial number is then flagged (step 720) by, for instance, adding it to a "watch list." The network administrator can further specify (step 730) whether the client key is to be either (a) temporarily disabled or (b) permanently killed. The watch list is then periodically uploaded (step 740) to all access points 220 on the network. Upon receipt of the new or updated watch list, the access point 220 periodically checks (step 750) the serial numbers of the client keys 240 of computing devices 210 currently connected and also those subsequently connected at a later time. For example, the access point 220 may keep and periodically check a "Connected Users Table," which specifies the serial numbers of all the client keys 240 associated with computing devices 210 currently connected to the network 200.

If a serial number match is found between the watch list and the connected users table, the access point initiates (step 760) the specified action for that user, e.g., disable or kill the NUFS. For example, the access point 220 sends an encrypted packet to the user containing the necessary command and control data to disable the user's access. The NIC driver decrypts the packet and recognizes that it is to either disable/kill the authentication parameters, e.g., network cryptographic keys, for this particular network. The NIC driver communicates with the client key 240 to take appropriate action. Optionally, a pop-up message is displayed to the user indicating that his access has either been temporarily suspended or his network access revoked. The access point 220 immediately terminates further communications with the user and erases the serial number of that user in the connected user's table, upon which the user is forced to re-authenticate with the network 200. Accordingly, one of two conditions prevails. For example, if the user's rights were terminated, e.g., the network authentication parameters were erased, the user simply cannot connect nor has any means for encrypting/decrypting packets to/from the access point 220. If the user's rights were simply suspended, the NUFS status flag will have been changed to "expired" and the user will see that the only network access he has is via HTTP requests to the network administrator or network billing system.

The previous examples focused principally on hot-spot networks where users access is measured either in the number of connections, the number of day's worth of access, or other usage based criteria. Just as easily and in a different context, the usage application can manage user access to the network by a range of IP addresses, subnets, or even a single IP address. All of this can be implemented in addition to access time restrictions and the like. The flexibility of this management scheme becomes readily apparent from the following description.

In an enterprise, users are typically provided an account ID and password that form the principal identifiers used to grant access to the user on the network. The network administrator can specify access by individual or group, but generally this becomes very complex as the number of users becomes large and the number of restrictions put in place. Of even greater importance and thus difficulty is the fact that network administration under Windows, for example, doesn't authenticate the user, only the user's login name and password. It is not unexpected that the same user can be logged in from more than one machine on the same network. If certificates are used to further restrict a user's ability to connect, the certificates must be different on each machine used by the user.

In the case of certificates that are used for authentication, each connection attempt (or login) by a user must follow a Verification of the user's certificate. To validate the certificate, the user's certificate must not only be validated, but the entity that issued the certificate must be checked and then the entity who certified the previous entity, etc. until the root certificate has been verified. This methodology is required for two reasons: first to make sure that the system knows who the user is and second to make sure that the credentials are valid. After this certificate verification takes place, then where the user is allowed to go on the network is managed by yet another process.

IT systems tend to centralize these functions to make them easier to manage. Centralized management is a noble goal, but forces all network communications to go through one or more intermediates with high network traffic and concentration before a user can actually get to a desired location.

In the present methodology, the identity of the user and his network permissions are established by the network administrator at the time the users rights are provided. These rights are then installed into the user's secure, tamper-resistant physical token along with the usage application. Thereafter, all access management is negotiated between the local access point and the user's client key. No centralized server is used nor needed. Management is thereafter by exception. In other words, should a user's network permission need to be changed, the users' client key serial number is placed on a watch list within each access point and the users' permissions are changed on the next access.

The network administrator can establish a Class of Service (COS) for a user or group of users. Referring to FIG. 8, two different COS are embodied in respective NUFSs, which are similar to those discussed previously for hot-spot networks. Particularly, FIG. 8A depicts a NUFS 800 wherein the user is granted unrestricted access both for the IP address and time of access. NUFS 850 as depicted in FIG. 8B allows the user send TCP/IP packets to a restricted range of IP addresses between 10.0.2.1 and 10.0.2.15. Any packets whose IP address is outside that range will be dropped at the access point. Further, any access to the network outside of the time range (normal working hours) is not allowed.

This type of methodology provides an unlimited number of restriction possibilities. Only two are shown here, e.g., IP range and date/time. These options can be expanded to include lists of specific machines and any number of other parameters.

The sequence of access management is virtually identical to that shown in the commercial (hot-spot) example previously explained with one important difference. Particularly, it is important in the enterprise that once access rights are provided to a user, they not be provided indefinitely. To support this, a special field, e.g., "Release Time," can be provided in the NUFS that lets the usage application know when the user's credentials expire. For example, unless otherwise provided by the network administrator, NUFS 800 and NUFS 850 expire on Sep. 5, 2002 at 11:50 A.M. This provides a fail-safe method of access management for each individual user. The 'Release Time' value is optional and can be set to any value as necessary by the network administrator. On a very tightly controlled network, this can be set to daily or even hourly whereas on other networks that don't require a high-level of security beyond that provided by the client key 240 itself, this release time could be set to 30 days for example.

On expiration, the usage application will have already been provided an IP address, but has determined that its' network permission has been expired. The access point however, allows the user to connect to the IP address of the machine on the network that manages user client key 240 credentials where the user's NUFS will automatically be updated or the user's client key 240 will be terminated as necessary. For example, upon determining the NUFS has expired, the usage application sends a command to the NIC driver to in turn send an NUFS update request to the access point 220. The access point 220 then sends an IP packet to the administration server containing the user's client key 240 serial number. If the client key 240 serial number is still allowed to access the network, the timeout period is extended as set by the network administrator. The administration server returns a new NUFS in an encrypted IP packet, which is decrypted and installed at the computing device 210. If the user's permissions were to be terminated, the administration server at that time can return a packet that results in deletion of the NUFS for the network.

In a related embodiment of the invention, the usage application can generate a report listing one of more of the values of any of the usage variables mentioned above for communication to a Billing Server on the network.

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

I claim:

1. A method for managing network access of a device, which is capable of communicating with one or more networks, comprising the steps of:
    identifying the device and a secure token as being associated with a user for which network access is to be discontinued;
    accessing a serial number associated with the secure token;
    adding the serial number to a watch list comprising a plurality of serial numbers, wherein each of the plurality of serial numbers is associated with a corresponding secure token and wherein each corresponding secure token is associated with a user for which network access it to be discontinued;
    transmitting the watch list to a plurality of access points on a network, wherein each access point is configured to:
        determine whether the device is currently connected to the network based on the serial number; and
        disable a network usage feature set associated with the secure token based at least on the determination that the device is currently connected to the network.

2. The method of claim 1, wherein the secure token comprises a secure tamper-resistant physical token.

3. The method of claim 1, wherein secure token is configured to be operatively coupled to the device.

4. The method of claim 1, wherein the secure token is configured to be local to and removably attachable to the device.

5. The method of claim 1, wherein the secure token is implemented through a USB adaptor.

6. The method of claim 5, wherein the application comprises a usage application.

7. The method of claim 1, wherein the secure token is unique to the device.

8. The method of claim 1, wherein the serial number is stored in the secure token.

9. The method of claim 1, wherein the secure token comprises authentication information for authenticating the device to the network.

10. The method of claim 1, wherein the secure token comprises a processor configured to execute an application.

11. A system for managing network access of a device, which is capable of communicating with one or more networks, the system comprising:
- a computing apparatus configured to identify the device and a secure token as being associated with a user for which network access is to be discontinued;
- a computing apparatus configured to access a serial number associated with the secure token;
- a computing apparatus configured to add the serial number to a watch list comprising a plurality of serial numbers, wherein each of the plurality of serial numbers is associated with a corresponding secure token and wherein each corresponding secure token is associated with a user for which network access it to be discontinued;
- a computing apparatus configured to transmit the watch list to a plurality of access points on a network, wherein each access point is configured to:
  - determine whether the device is currently connected to the network based on the serial number; and
  - disable a network usage feature set associated with the secure token based at least on the determination that the device is currently connected to the network.

12. The system of claim 11, wherein the secure token comprises a secure tamper-resistant physical token.

13. The system of claim 11, wherein secure token is configured to be operatively coupled to the device.

14. The system of claim 11, wherein the secure token is configured to be local to and removably attachable to the device.

15. The system of claim 11, wherein the secure token is implemented through a USB adaptor.

16. The system of claim 11, wherein the secure token is unique to the device.

17. The system of claim 11, wherein the serial number is stored in the secure token.

18. The system of claim 11, wherein the secure token comprises authentication information for authenticating the device to the network.

19. The system of claim 11, wherein the secure token comprises a processor configured to execute an application.

20. The system of claim 11, wherein the application comprises a usage application.

* * * * *